J. M. CLARK.
Mill Bolt.
No. 6,982. Patented Jan'y 1, 1850.
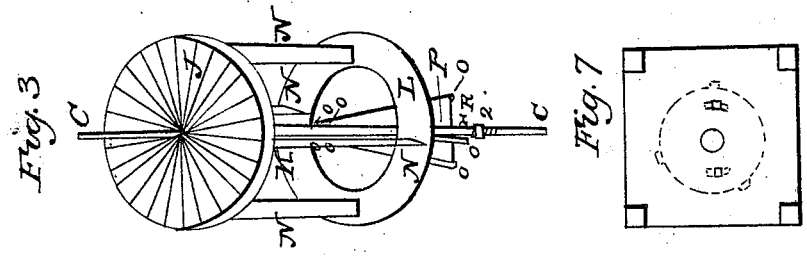
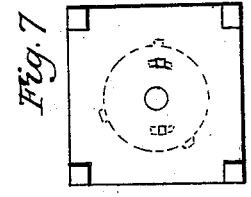
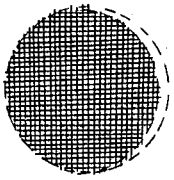
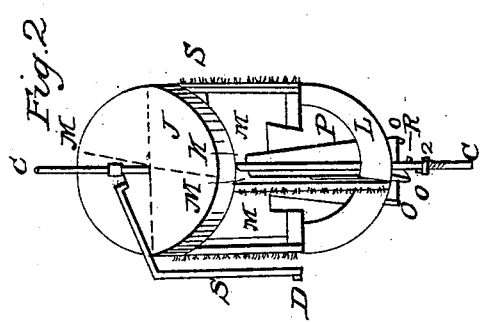
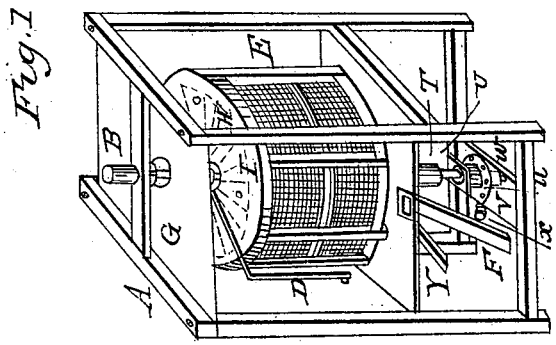
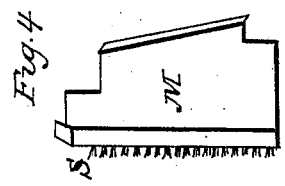

UNITED STATES PATENT OFFICE.

JAMES M. CLARK, OF LANCASTER, PENNSYLVANIA.

COMBINING GRINDING AND BOLTING MACHINES.

Specification of Letters Patent No. 6,982, dated January 1, 1850.

*To all whom it may concern:*

Be it known that I, JAMES M. CLARK, of Lancaster city, State of Pennsylvania, have invented a new and useful Portable Flour-Mill; and I do hereby declare that the following is a full, clear, and exact description of the construction and operation of the same, reference being had to the annexed drawings, making a part of this specification, in which—

Figure 1 is a perspective view of the portable flour mill, Fig. 2 represents the runner with the shaft and wings, Fig. 3 without the movable wings, Fig. 4 a movable wing, Figs. 5 and 6 the brush and wire horizontal surfaces, Fig. 7 an underneath view of the lower floor of machine representing the lower end or bottom of cylinder with the screw bolts extending through the oblong apertures.

My invention consists in the combination of a grinding mill and bolter, all on one shaft and grinding and bolting flour at a single operation.

The parts constituting my machine being all adapted to perform their various offices together, and they are so constructed as to have an independent adjustment for the purposes intended by which I am enabled to make a simple portable machine that will answer all the purposes of a grinding mill and bolting machine.

To enable others skilled in the art to make and use my invention, I will proceed to describe its construction and operation, I construct my machine of any size required for the quantity of flour to be made, from 24 inches in diameter and upward, of suitable framework inclosing the whole and properly retaining the flour, so that the machine may be used in a mill or any desirable place.

Fig. 1 is a perspective view of the machine representing the frame work A, and B the top journal case or box; C, the shaft passing from the top of the frame to the bottom; connected to the shaft $c$ is a sweep D, which revolves with the shaft when in operation, and extends outward to beyond the concave cylinder E, supported by suitable framework, and then downward to near the floor of the framework, for the purpose of sweeping around the concave cylinder E, and sweeping the flour as it passes through and out of cylinder E to the spout F, where the flour is discharged; G, the square top head of the framework made of wood or suitable material resting firmly on the four sides of the framework; H, the head of concave cylinder E of cast iron with an outside rim to fit close over the cylinder E, and underneath the head is a mill bur or horizontal surface I, made of any material, firmly attached and fastened by bolts, for the purpose of grinding or pulverizing between it and the lower bur, or horizontal surface J, made of any material, attached to the shaft $c$, and resting on and fastened by screw bolts to the cast iron runner K; L, the cast iron base of the runner K, having an aperture to admit the shaft $c$ and likewise the air or draught into the cylinder E to assist the ejection of the flour through gauze wire of the concave cylinder E, and at the same time cool the flour as it passes from the burs or horizontal surfaces I and J. M are four movable upright wings resting on the cast iron base L of the runner K and supported by four perpendicular stationary wings N, which form the runner K and combine the head and bur J with the base L. These movable wings M slide in toward the center shaft $c$ where they are held and moved by a corresponding groove on each of the four conical wings O which are made of cast iron and attached to the shaft $c$, sliding with a boss or collar P to its termination at the screw nut Q connected to the shaft $c$. Said boss or collar P having a set screw R for the purpose of making it stationary to the shaft $c$ after being adjusted upward or downward on the shaft $c$, the screw nut 2 working up and down the shaft $c$ on a corresponding screw cut upon the shaft $c$. This screw nut 2 has a small hook attached which hooks into a groove at the lower end of the boss or collar P. To the movable wings M are attached the brushes S and by the screw nut 2 the conical shaped wings O are raised and lowered and thus operate upon the movable wings M which graduate the brushes S inward or outward to the gauze wire concave of the cylinder E, for the purpose of working the flour from the offal closer or not so close as the operator may require and at the same time have the full benefit or use of the brushes until entirely worn out, and making the brushes $s$ at their last operation as perfect as when the machine was first put up. Underneath the floor is the pulley T attached to the shaft $c$ for the purpose of giving motion to the machine, below the pulley T is a peculiar step U, resting or bearing upon the cross tie V of the frame, for the lower journal of shaft c to run in. This step U is of cast iron and has a screw at its lower center extending through the cross tie V and through a cup W which is fastened to the cross tie V by a flange. The step U is square at the top, for the purpose of being turned by a wrench, the balance of it being round, so as to fit in the cup W. The cup W has an aperture with a screw thread to fit the screw attached to the bottom of the step U for the purpose of lowering and raising the shaft c so as to graduate the burs or horizontal surfaces I and J one to the other at top of runner K. X is the set screw passing through the cross tie V and the cup W and pressing against the step U to preserve its position after being graduated. The bottom of the concave cylinder E is made of cast iron and has supports extending along the outside of and screwed to the framework of cylinder E to keep it firm in its place. In the bottom of cast iron plate of cylinder E are two oblong apertures through which two screw bolts pass and extend through the floor of framework to hold the cylinder E firm in its place, and by partly loosening the screw bolts, the cylinder E can at any time be shifted so as to extend at equal distances from the runner K and maintain a perfect center. The brush and wire horizontal surfaces are to take the places of upper and lower burs or horizontal surfaces I and J when required to operate as an offal flour machine. Y is the spout to conduct the offal, from the machine, after being operated upon.

What I claim as my invention, and desire to secure by Letters Patent is—

The combination of an adjustable grinding mill, with an adjustable bolting machine, both worked on one shaft, and adapted to each other, so that both or either can be adjusted independent of the other, substantially in the manner and for the purposes above made known.

JAMES M. CLARK.

Witnesses:
THOMAS M. CLARK,
I. FRANKLIN REIGART.